US010111066B2

(12) United States Patent
Lin et al.

(10) Patent No.: US 10,111,066 B2
(45) Date of Patent: Oct. 23, 2018

(54) METHODS TO SUPPORT MEASUREMENTS FOR USER EQUIPMENT

(71) Applicant: MEDIATEK INC., Hsinchu (TW)

(72) Inventors: Kuhn-Chang Lin, Chiayi (TW); Tsang-Wei Yu, Hsinchu County (TW); Chiao Yao Chuang, Hsinchu County (TW)

(73) Assignee: HFI Innovation Inc., HsinChu (TW)

(*) Notice: Subject to any disclaimer, the term of this patent is extended or adjusted under 35 U.S.C. 154(b) by 149 days.

(21) Appl. No.: 15/008,281

(22) Filed: Jan. 27, 2016

(65) Prior Publication Data
US 2016/0219601 A1 Jul. 28, 2016

Related U.S. Application Data

(60) Provisional application No. 62/108,640, filed on Jan. 28, 2015.

(51) Int. Cl.
*H04W 72/08* (2009.01)
*H04W 4/00* (2018.01)
(Continued)

(52) U.S. Cl.
CPC .............. *H04W 4/70* (2018.02); *H04L 5/001* (2013.01); *H04L 5/0039* (2013.01);
(Continued)

(58) Field of Classification Search
CPC ............ H04W 48/16; H04W 36/0088; H04W 72/085; H04W 72/0446; H04W 72/042;
(Continued)

(56) References Cited

U.S. PATENT DOCUMENTS

| 30,088,985 | 4/2013 | Park et al. ............... 370/252 |
| 50,195,069 | 7/2015 | Yi et al. ............... 370/329 |

(Continued)

FOREIGN PATENT DOCUMENTS

| CN | 103281700 A | 9/2013 |
| WO | WO 02014021632 A1 | 7/2012 |

(Continued)

OTHER PUBLICATIONS

International Search Report and Written Opinion of International Search Authority for PCT/CN2016/000062 dated Apr. 27, 2016 (11 pages).

(Continued)

*Primary Examiner* — Hoang-Chuong Q Vu
(74) *Attorney, Agent, or Firm* — Imperium Patent Works; Zheng Jin

(57) ABSTRACT

Methods to support measurements for LTE user equipments are proposed. Due to reduced bandwidth design for cost reduction, resources for UEs are limited to contiguous six physical resource block (PRB) pairs (1.4 MHz). Six or less contiguous PRBs per narrow sub-band located in the whole channel bandwidth is allocated for transmission and reception for UEs. Novel control channel and data channel designs are proposed to make UEs be able to camp on LTE cells. Methods for intra-frequency measurement, for received signal time difference (RSTD) measurement, and for channel quality assessment for UEs are also provided. In one embodiment, UE is allocated with a measurement gap for intra-frequency measurements and RSTD measurements. In another embodiment, UE is configured with a frequency-hopping pattern and receives a PRB pair starting index per subframe for CSI measurement.

18 Claims, 8 Drawing Sheets

(51) Int. Cl.
  *H04W 4/70* (2018.01)
  *H04W 24/08* (2009.01)
  *H04W 72/04* (2009.01)
  *H04L 5/00* (2006.01)
  *H04B 17/318* (2015.01)
  *H04B 17/364* (2015.01)

(52) U.S. Cl.
  CPC .......... *H04L 5/0044* (2013.01); *H04L 5/0053* (2013.01); *H04W 24/08* (2013.01); *H04W 72/042* (2013.01); *H04W 72/0453* (2013.01); *H04W 72/085* (2013.01); *H04B 17/318* (2015.01); *H04B 17/364* (2015.01); *H04L 5/0092* (2013.01); *H04W 72/048* (2013.01)

(58) Field of Classification Search
  CPC ........... H04W 72/0453; H04W 72/048; H04W 24/08; H04W 4/005
  See application file for complete search history.

(56) References Cited

U.S. PATENT DOCUMENTS

| | | | |
|---|---|---|---|
| 60,353,440 | 12/2016 | Lee et al. | 370/329 |
| 70,374,570 | 12/2017 | Yi et al. | |
| 2011/0170516 A1 | 7/2011 | Hu et al. | 370/331 |
| 2012/0307869 A1* | 12/2012 | Charbit | H04B 1/715 375/132 |
| 2013/0088985 A1* | 4/2013 | Park | H04W 48/16 370/252 |
| 2013/0294361 A1 | 11/2013 | Chen et al. | 370/329 |
| 2014/0140310 A1 | 5/2014 | Liu et al. | 370/329 |
| 2014/0301359 A1 | 10/2014 | Seo et al. | 370/330 |
| 2015/0036519 A1 | 2/2015 | Kazmi et al. | 370/252 |
| 2015/0071101 A1* | 3/2015 | Mager | H04W 24/10 370/252 |
| 2015/0215940 A1* | 7/2015 | Goldhamer | H04W 24/10 370/252 |
| 2015/0245379 A1 | 8/2015 | Nguyen | |
| 2016/0081020 A1* | 3/2016 | Rahman | H04W 76/025 370/311 |
| 2016/0127918 A1 | 5/2016 | Yi et al. | 370/329 |
| 2016/0205717 A1* | 7/2016 | Kazmi | H04W 8/22 455/435.2 |
| 2017/0105166 A1 | 4/2017 | Lee et al. | 370/329 |
| 2017/0111884 A1* | 4/2017 | Sadeghi | H04W 68/02 |
| 2017/0142738 A1* | 5/2017 | You | H04W 72/085 |
| 2017/0181032 A1* | 6/2017 | Kazmi | H04W 28/044 |
| 2018/0007731 A1* | 1/2018 | Park | H04W 24/08 |

FOREIGN PATENT DOCUMENTS

| | | |
|---|---|---|
| WO | WO2014204285 A1 | 6/2013 |
| WO | WO2014038218 A1 | 3/2014 |
| WO | WO2014104960 A1 | 7/2014 |

OTHER PUBLICATIONS

International Search Report and Written Opinion of International Search Authority for PCT/CN2016/000063 dated Apr. 19, 2016 (10 pages).
3GPP TSG-RAN WG1 #76bis R1-141144, Intel Corporation, Discussion on UCI multiplexing on PUSCH in measurement gap, Shenzhen, China, Mar. 31-Apr. 4, 2014 (3 pages).
EPO, search report for the EP patent application 16742634.5 dated Feb. 12, 2018 (12 pages).
3GPP TSG-RAN WG1 Meeting #79 R1-144990, Nokia Networks et al., "Assumptions and Constraints for Supporting 1.4 MHz Low Cost MTC UE", San Francisco, Nov. 17-21, 2014, *p. 2, line 15-line 27*, *p. 2, line 44-line 51*, *p. 3, line 1-line 13* (4 pages).
3GPP TSG-RAN WG4 Meeting #70 R4-140791, Ericsson, "Overview of RRM requirements for low-cost MTC", Prague, Czech Republic, Feb. 10-14, 2014, *p. 1, line 1-line 7*, *p. 2, line 10-line 20* (2 pages).
3rd Generation Partnership Project; Technical Specification Group Radio Access Network; Evolved Universal Terrestrial Radio Access (E-UTRA); Medium Access Control (MAC) protocol specification (Release 12), 3GPP TS 36.321 V12.4.0 (Dec. 2014) *p. 33, line 6-line 16*.
USPTO, Office Action for the related U.S. Appl. No. 15/008,267 dated Jan. 8, 2018 (18 pages).
EPO, search report for the EP patent application 16742633.7 dated May 8, 2018 (14 pages).
R1-135022 3GPP TSG RAN WG1 Meeting #75, Huawei et al., "Timing relationship between PCCCH and PDSCH for coverage improvement", San Francisco, USA, Nov. 11-15, 2013. *section 1*, *section 2.1*, *section 2.2*.
3GPP TS 36.213 V12.4.0 (2014012), #3rd Generation Partnership Project; Technical Specification Group Radio Access Network; Evolved Universal Terrestrial Radio Access (E-UTRA); Physical layer procedures (Release 12), *section 9.1.4*.
USPTO, Office Action for the related U.S. Appl. No. 15/008,267 dated Jul. 18, 2018 (17 pages).

* cited by examiner

METHODS TO SUPPORT MEASUREMENTS FOR USER EQUIPMENT

CROSS REFERENCE TO RELATED APPLICATIONS

This application claims priority under 35 U.S.C. § 119 from U.S. Provisional Application No. 62/108,640, entitled "The Methods to Support LTE UEs with Bandwidth Reduction," filed on Jan. 28, 2015, the subject matter of which is incorporated herein by reference.

TECHNICAL FIELD

The disclosed embodiments relate generally to LTE networks, and, more particularly, to channel design and measurement for LTE user equipments (UEs).

BACKGROUND

Machine-Type Communication (MTC) is an important revenue stream for operators and has a huge potential from the operator perspective. Lowering the cost of MTC user equipment (UEs)/devices is an important enabler for the implementation of the concept of "Internet of Things" (IOT). Many MTC devices are targeting low-end (low average revenue per user, low data rate) applications that can be handled adequately by GSM/GPRS. Owing to the low-cost of these devices and good coverage of GSM/GPRS, there is very little motivation for MTC UE suppliers to use modules supporting the LTE radio interface. In order to ensure that there is a clear business benefit to MTC UE vendors and operators for migrating low-end MTC devices from GSM/GPRS to LTE networks, a new type of terminal, i.e. a low cost (LC) MTC UE, is introduced in Rel-11. The cost of the LC-MTC UEs is tailored for the low-end of the MTC market to be competitive with that of GSM/GPRS terminals. The LC-MTC UEs are characterized by: 1) One Rx antenna; 2) Downlink and uplink maximum TBS size of 1000 bits; 3) Bandwidth reduction (BR)—resources for each channel transmission are limited to contiguous 6 PRBs (1.4 MHz) for cost reduction, and 4) Coverage enhancement—some applications of LC-MTC UEs will require 15-20 dB coverage extension and repeated transmission is a common technique to compensate penetration losses.

In LTE Rel. 12, it is shown that the implementation of half-duplex FDD (HD-FDD) MTC with single received antenna is cost-competitive. The bandwidth reduction technique can offer further cost reduction. The UE with bandwidth reduction (BR-UE) can be implemented with lower cost by reducing the buffer size, clock rate for signal processing, and so on. However, it also faces many challenges when the BR-UE tries to camp on the LTE cell of which cell bandwidth is larger than the supported bandwidth of its bandwidth. In LTE, the control channels including PCFICH, PHICH and PDCCH span over whole bandwidth. When the supported bandwidth at the BR-UE is less than cell bandwidth indicated by PBCH, the BR-UE is only capable of decoding PBCH and PSS/SSS allocated in center 6 PRB pairs. The BR-UE is not able to decode SIBs, PDSCH, RAR, or Paging due to lack of ability of decoding control channels. Novel control channel designs are needed to make the BR-UE be able to camp on the LTE cell.

When there are too many BR-UEs, it is impossible for the serving eNodeB to schedule all BR-UEs at center 6 PRB pairs. Consequently, the serving eNodeB may try to schedule different BR-UEs at different PRB pairs. In these cases, the BR-UE that is not scheduled at the center 6 PRB pairs is unable to perform intra-frequency measurement for handover and Reference Signal Time Difference (RSTD) measurement. Therefore, methods for intra-frequency/RSTD measurement are needed.

Moreover, the BR-UE cannot offer the channel quality report of whole downlink (DL) cell bandwidth. The BR-UE cannot measure the wideband CQI at single subframe. Therefore, methods to assess the whole bandwidth are needed such that the serving eNodeB can schedule BR-UEs in efficient manner.

SUMMARY

Methods to support LTE user equipments with bandwidth reduction are proposed. Due to reduced bandwidth design for cost reduction, resources for UEs are limited to contiguous six physical resource block (PRB) pairs (1.4 MHz). Six or less contiguous PRBs per narrow sub-band located in the whole channel bandwidth is allocated for transmission and reception for UEs. Novel control channel and data channel designs are proposed to make UEs be able to camp on LTE cells. Methods for intra-frequency measurement, for received signal time difference (RSTD) measurement, and for channel quality assessment for UEs are also provided.

In one embodiment, a serving base station configures a CE mode for a user equipment (UE) in a mobile communication network. The base station allocates a set of resources to the UE. The set of resources belongs to a narrow subband in a wider channel bandwidth. The narrow subband comprises a plurality of contiguous PRB pairs including a control channel and a data channel. The base station provides the control channel configuration information to the UE. The control channel occupies over one or more subframes within the set of resources. The control channel configuration information comprises a number of aggregation level, a number of repetition, and a number of blind decoding trials. In one example, the base station assigns a measurement gap for intra-frequency and RSTD measurements. In another example, the base station configures frequency hopping for the UE and indicates PRB pair starting index per subframe for channel state information (CSI) measurements.

In another embodiment, a user equipment (UE) configures a CE mode in a mobile communication network. The UE determines a set of resources allocated to the UE. The set of resources belongs to a narrow subband in a wider channel bandwidth. The narrow subband comprises a plurality of contiguous PRB pairs including a control channel and a data channel. The UE obtains the control channel configuration information. The control channel occupies over one or more subframes within the set of resources. The control channel configuration information comprises a number of aggregation level, a number of repetition, and a number of blind decoding trials. In one example, the UE is assigned a measurement gap for intra-frequency and RSTD measurements. In another example, the UE is configured with frequency hopping and receives PRB pair starting index per subframe for channel state information (CSI) measurements.

In one embodiment, a base station allocates a first set of resources to a UE in a mobile communication network. The first set of resources belongs to a first narrowband in a wider channel bandwidth. The first narrowband comprises a plurality of contiguous PRB pairs over a first period. The base station allocates a second set of resources to the UE. The second set of resources belongs to a second narrowband comprising a plurality of contiguous PRB pairs over a second period. The base station assigns a measurement gap between the first and the second periods for intra-frequency and RSTD measurements for the UE. In one example, the base station configures a frequency-hopping pattern for the UE and indicates PRB pair starting index per subframe for CSI measurements.

In another embodiment, a UE obtains a first set of resources in a mobile communication network. The first set of resources belongs to a first narrowband in a wider channel bandwidth. The first narrowband comprises a plurality of contiguous PRB pairs over a first period. The UE obtains a second set of resources belongs to a second narrowband comprising a plurality of contiguous PRB pairs over a second period. The UE performs intra-frequency and RSTD measurements based on an assigned measurement gap between the first and the second periods. In one example, the UE is configured with frequency hopping and receives PRB pair starting index per subframe for channel state information (CSI) measurements.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Machine type communication is a form of data communication that involves one or more entities that do not necessarily need human interaction. A service optimized for machine type communication differs from a service optimized for human-to-human (H2H) communication. Typically, MTC services are different to current mobile network communication services because MTC services involve different market scenarios, pure data communication, lower cost and effort, and a potentially very large number of communicating terminals with little traffic per terminal. Therefore, it is important to distinguish low cost (LC) MTC from regular UEs. UE with bandwidth reduction (BR-UE) can be implemented with lower cost by reducing the buffer size, clock rate for signal processing, and so on. However, it also faces many challenges when BR-UE tries to camp on the LTE cell of which cell bandwidth is larger than the supported bandwidth of its bandwidth. Further, BR-UE that is not scheduled at center 6 PRB pairs is unable to perform intra-frequency measurement for handover and Reference Signal Time Difference (RSTD) measurement. Moreover, BR-UE cannot offer the channel quality report of whole downlink (DL) cell bandwidth. Apparatus and methods are thus provided and described below in details to support LTE UEs with bandwidth reduction.

Figure 1:
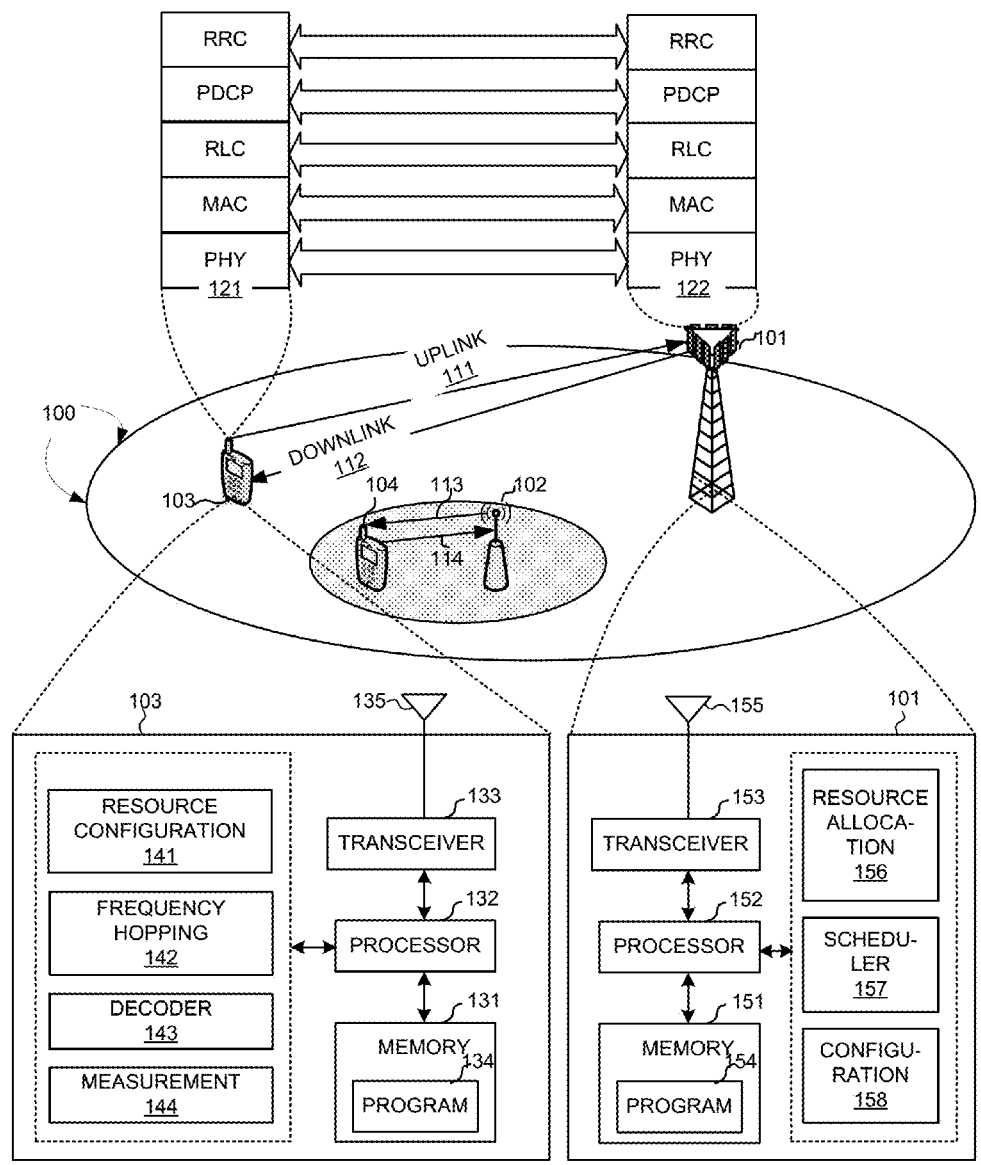
FIG. 1 illustrates a mobile communication network 100 with BR-UEs in accordance with embodiments of the current invention.

FIG. 1 illustrates a mobile communication network 100 with BR-UEs in accordance with embodiments of the current invention. Wireless communication system 100 includes one or more fixed base infrastructure units forming a network distributed over a geographical region. The base unit may also be referred to as an access point, an access terminal, a base station, a Node-B, an eNode-B (eNB), or by other terminology used in the art. In FIG. 1, the one or more base stations 101 and 102 serve a number of MTC UEs 103 and 104 within a serving area, for example, a cell or a cell sector. In one embodiment, MTC UEs 103 and/or 104 are regular UEs that are configured to be MTC UEs. In another embodiment, regular UEs can be configured to be BR-UEs. A BR-UE can be configured from a regular UE, an MTC UE or any other type of UE. The BR-UE can be configured locally on the UE or dynamically configured through network signaling. In some systems, one or more base stations are communicably coupled to a controller forming an access network that is communicably coupled to one or more core networks. The disclosure, however, is not intended to be limited to any particular wireless communication system.

Generally, serving base stations 101 and 102 transmit downlink communication signals 112 and 113 to MTC UEs in the time and/or frequency domain. MTC UEs 103 and 104 communicate with one or more base stations 101 and 102 via uplink communication signals 111 and 114. UE or the mobile station may also be referred to as a mobile phone, laptop, and mobile workstation and so on. In FIG. 1, the mobile communication network 100 is an OFDM/OFDMA system comprising a base station eNB 101 eNB 102 and a plurality of BR-UE 103 and BR-UE 104. When there is a downlink packet to be sent from the eNB to the BR-UE, each BR-UE gets a downlink assignment, e.g., a set of radio resources in a physical downlink shared channel (PDSCH).

When a BR-UE needs to send a packet to eNB in the uplink, the BR-UE gets a grant from the eNB that assigns a physical downlink uplink shared channel (PUSCH) consisting of a set of uplink radio resources. The BR-UE gets the downlink or uplink scheduling information from a physical downlink control channel (PDCCH) or an enhanced PDCCU (ePDCCH) that is targeted specifically to that BR-UE. The downlink or uplink scheduling information and the other control information, carried by PDCCH/ePDCCH, is referred to as downlink control information (DCI).

FIG. 1 also shows an exemplary diagram of protocol stacks for control-plane for BR-UE 103 and eNB 101. BR-UE 103 has a protocol stack 121, which includes the physical (PHY) layer, the medium access control (MAC) layer, the radio link control (RLC) layer, the pack data convergence protocol (PDCP) layer, and the radio resource control (RRC) layer. Similarly, base station eNB 101 has a protocol stack 122, which includes the PHY layer, the MAC layer, the RLC layer, the PDCP layer, and the RRC layer, each of which connects with their corresponding protocol stack of BR-UE protocol stack 121.

FIG. 1 further illustrates simplified block diagrams for BR-UE 103 and eNB 101, respectively. BR-UE 103 has an antenna 135, which transmits and receives radio signals. A RF transceiver module 133, coupled with the antenna, receives RF signals from antenna 135, converts them to baseband signals and sends them to processor 132. RF transceiver 133 also converts received baseband signals from processor 132, converts them to RF signals, and sends out to antenna 135. Processor 132 processes the received baseband signals and invokes different functional modules to perform features in BR-UE 103. Memory 131 stores program instructions and data 134 to control the operations of BR-UE 103. BR-UE 103 also includes multiple function modules that are circuits to be implemented and configured to carry out different tasks in accordance with embodiments of the current invention. A resource configuration module 141 acquires resource allocation information, either from predefined rules, from higher layer messaging, from physical layer signaling, or any combination thereof, and determines the allocated resources for downlink reception and uplink transmission. A frequency-hopping module 142 receives frequency-hopping information from the base station and determines frequency hopping at different subframes for coverage extension. A decoder 143 performs blind decoding of allocated control and data channels. A measurement module 144 performs intra-frequency measurement for handover and Reference Signal Time Difference (RSTD) measurement, as well as channel state information (CSI) measurement with narrowband channel quality indicator (CQI) to support wideband CQI.

Also shown in FIG. 1 is an exemplary block diagram for eNB 101. eNB 101 has an antenna 155, which transmits and receives radio signals. A RF transceiver module 153, coupled with the antenna, receives RF signals from antenna 155, converts them to baseband signals, and sends them to processor 152. RF transceiver 153 also converts received baseband signals from processor 152, converts them to RF signals, and sends out to antenna 155. Processor 152 processes the received baseband signals and invokes different functional modules to perform features in eNB 101. Memory 151 stores program instructions and data 154 to control the operations of eNB 101. eNB 101 also includes function modules that carry out different tasks in accordance with embodiments of the current invention. A resource allocation module 156 performs resource allocation functions to support the BR-UE with reduced overhead and improved system performance. A scheduler 157 schedules uplink transmission and downlink reception for the BR-UE based on the allocated resources. A configuration module 158 assigns frequency hopping patterns and measurement gaps for the BR-UE to enable frequency diversity gain and measurements functionalities.

Figure 2:
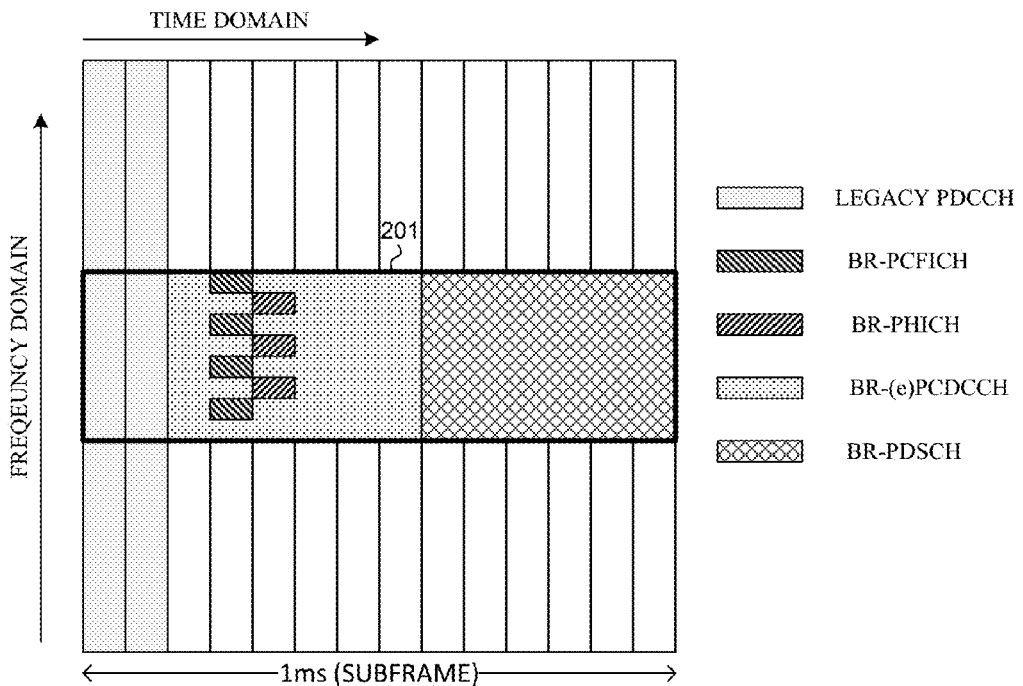
FIG. 2 illustrates control channel and data channel design for BR-UEs in accordance with one novel aspect.

FIG. 2 illustrates control channel and data channel designs for BR-UEs in accordance with one novel aspect. Due to reduced bandwidth design for cost reduction, resources for BR-UEs are limited to contiguous six physical resource block (PRB) pairs (1.4 MHz). Six or less contiguous PRBs per MTC narrow sub-band located in the whole channel bandwidth is allocated for transmission and reception, as depicted by box 201 of FIG. 2. However, such bandwidth reduction introduces the following problems. First, legacy control channels including PCFICH, PHICH, and PDCCH span over whole bandwidth such that BR-UE cannot hear the legacy control channel. It also means the BR-UEs are unable to receive data scheduled by legacy control channel. Second, the BR-UE can only receive the signal within x consecutive PRB pairs. The eNB may (dynamically) schedule the DL signal on different PRB pairs on subframe basis to support massive MTC devices. If there is no signal or predefined rules to make sure eNB and BR-UE know how to transmit and receive DL signal, the BR-UE will not be capable of receiving any signal from eNB. Even if the PRB pairs are known for both BR-UE and eNB, new control channel and data channel for BR-UE are necessary. Third, the first OFDM symbols of each subframe are occupied by legacy control channel but this information is not available for BR-UEs. As a result, BR-UE may have incorrect rate matching behavior. Fourth, For BR-UEs, the control channel is unreliable due to lack of frequency diversity. Consequently, the cell coverage shrinks and the BR-UE is likely in the coverage hole.

In accordance with one novel aspect, the proposed BR-PCFICH, BR-PDCCH, BR-PHICH, BR-control channel and BR-PDSCH for BR-UEs are designed with the following rules. To make sure that the BR-UE will listen to the PRBs pairs that the eNB may schedule all its DL channels on, the following parameters in every subframe shall be available at both the eNB side and the BR-UE side. Starting PRB index: it can be obtained by any of cell-specific predefined rules, UE-specific predefined rules, higher layer signaling on previous subframe(s), and new designed DCI on previous subframes(s). Number of consecutive PRB pairs that can are used to schedule DL signal for this BR-UE denotes as y: y can be a predefined value or from higher layer signaling on previous subframe(s) and new designed DCI on previous subframes(s). To successfully decode all DL channel, y shall be less than or equal to x.

Note that BR-PRB pairs are defined as the set of PRB pairs from PRB pair starting index to PRB pair starting index+y−1 that are used to schedule DL signal for this BR-UE. The PRB allocation of BR-PRB pairs can be changed on subframe basis. The PRB allocation of BR-PRB pairs can be decided according to predefined rules, random access response, DCI order, and higher layer signaling. With the knowledge of the location of the BR-PRB pairs, the BR-UE can decode all DL channels within the BR-PRB pairs. All DL channels within the BR-PRB pairs include control channel (BR-control channel) and data channel (BR-PDSCH). NACK/ACK of UL data transmission and information of BR-PDSCH decoding (e.g. RE location/modulation order/information size/transmission mode/corresponding reference signal/ . . . of BR-PDSCH) are carried in BR-control channel. The BR-control can be implemented by at least one of BR-PHICH, BR-PCFICH and BR-(e)PDCCH for BR-UE.

Within the BR-PRB pairs, BR-PCFICH is used to carry parameters to decode other BR-control channels and/or date channels for BR-UEs. BR-PHICH is used to indicate AC/NACK of UL data transmission for BR-UEs. Both BR-PCFICH and BR-PHICH can be distributed on several OFDM symbols or localized at one or several OFDM symbols within the PRB pairs. BR-PCFICH region within the PRB pairs can be known by BR-UEs by predefined rules and/or higher layer signaling. BR-PHICH region within the PRB pairs can be known by BR-UEs by predefined rules, BR-PCFICH, and higher layer signaling.

BR-(e)PDCCH within the BR-PRB pairs over one or several subframe can be used to carry higher layer command(s) and/or some information in DL data decoding for BR-UEs. The information in DL data decoding for BR-UEs can be at least one of: legacy control region size, RE locations, modulation order, information size, transmission mode, corresponding reference signal of BR-PDSCH, enable or disable of BR-PDSCH repetition, the repetition level and the starting subframe index of BR-PDSCH repetition is signaled. BR-(e)PDCCH within the BR-PRB pairs can be distributed, span at one or several OFDM symbol(s) or span one or several PRB pairs. BR-(e)PDCCH region within the BR-PRB pairs over one or several subframe can be obtained according to at least one of predefined rule, BR-PCFICH and higher layer signaling. The hypotheses of blind detection of BR-(e)PDCCH can be controlled according to at least one of predefined rule, BR-PCFICH and higher layer signaling. The BR-UEs can be requested to skip monitoring some subframes with new data transmission if configured by higher signaling. For example, to simplify decoding flow, BR-UE can skip monitoring the subframes with CSI-RS/ZP CSI-RS/NZP CSI-RS. Moreover, the active ratio is reduced and it is helpful to save more power.

BR-PDSCH within the BR-PRB pairs is used to carry higher layer signaling/data for BR-UEs. DL data can be UE-specific/Cell-specific/BR-UE specific for the particular group of BR-UEs (multicast). BR-PDSCH within the BR-PRB pairs is not overlapped with BR-control channel. BR-PDSCH within the BR-PRB pairs over one or several subframes can be obtained according to at least of the predefined rule(s), other BR-control channel(s) within the BR-PRB pairs over one or several subframes, and higher layer signaling. The information of BR-PDSCH decoding within the BR-PRB pairs can be obtained according to at least one of the predefined rule(s), BR-control channel(s) within the BR-PRB pairs over one or several subframe and higher layer signaling. To improve the quality of channel estimation, the pilots for BR-PDSCH decoding can be cell common pilots and/or BR-UE common/specific pilots.

Figure 3:
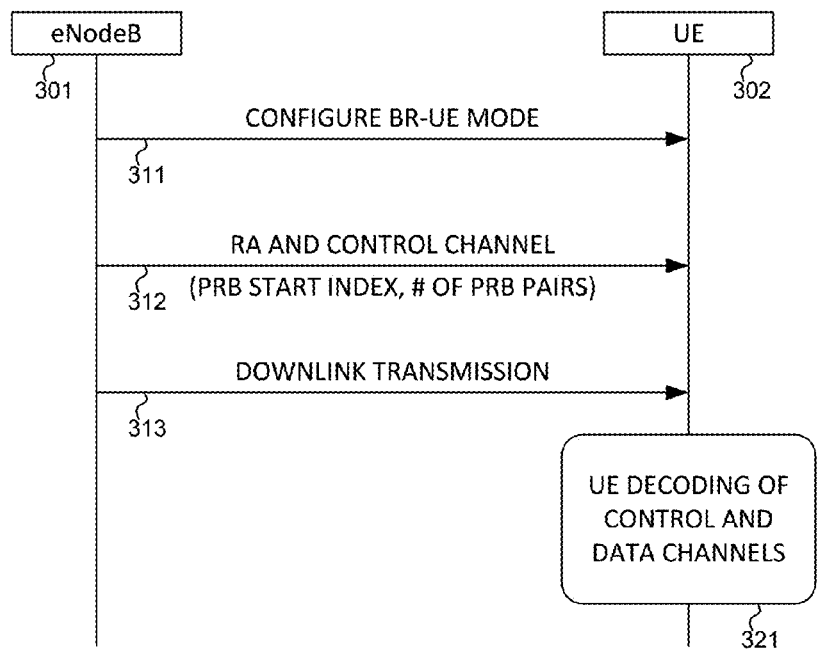
FIG. 3 illustrates a message sequence chart of resource allocation and configuring control and data channels for a BR-UE.

FIG. 3 illustrates a message sequence chart of resource allocation and configuring control and data channels for a BR-UE. In step 311, a serving eNB 301 configures a communication equipment (CE) mode for a BR-UE 302. Two CE modes are defined for RRC_Connected UEs. CE Mode A describes a set of behaviors for no repetitions and small number of repetitions. CE Mode B describes a set of behaviors for large number of repetitions. For each physical channel, there may be some common number of repetitions that can be used in CE Mode A and CE Mode B. The CE modes can have additional association with DCI formats, CSI feedback, etc. In step 312, eNB 301 allocates a set of resources that belongs to a narrow sub-band in a wider channel bandwidth to BR-UE 302. The narrow sub-band comprises a plurality of contiguous physical resource blocks (PRBs) including a control channel and a data channel for the BR-UE. For example, the starting PRB index and the number of consecutive PRB pairs are provided to BR-UE 302 via predefined rule and high layer signaling. In addition, eNB 301 configures BR-control channel within the allocated narrow sub-band for BR-UE 302. In one example, the control channel configuration information comprises a number of aggregation level, a number of repetition, and a number of blind decoding trials of the control channel. In step 313, eNB 301 transmits DL signals to UE 302, which includes both control channel and data channel. In step 321, UE 302 decodes the control channel and data channel within the allocated narrow sub-band based on the control channel configuration information.

BR-UE must be able to coexist with legacy LTE UE. The legacy CFI value is carried by PCFICH but BR-UEs are not able to decode PCFICH. If missing legacy CFI value, the rate matching behavior of all DL BR-channel could be incorrect. One solution is to indicate the starting OFDM index of BR-PDSCH in semi-static manner. The semi-static starting OFDM symbol can be from higher layer signaling or predefined value. For example, eNB can change legacy CFI value on subframe basis such that semi-static starting OFDM index of BR-PDSCH value must be larger than or equal to the maximum legacy control region to prevent incorrect data channel rate matching. However, configuring semi-static starting OFDM symbol of BR-PDSCH may waste some OFDM symbol resources. On the other hand, if the legacy CFI is also carried in BR-control channel, there is no wasted OFDM symbol. For example, the legacy CFI can be carried in BR-PCFICH or BR-(e)PDCCH.

Figure 4:
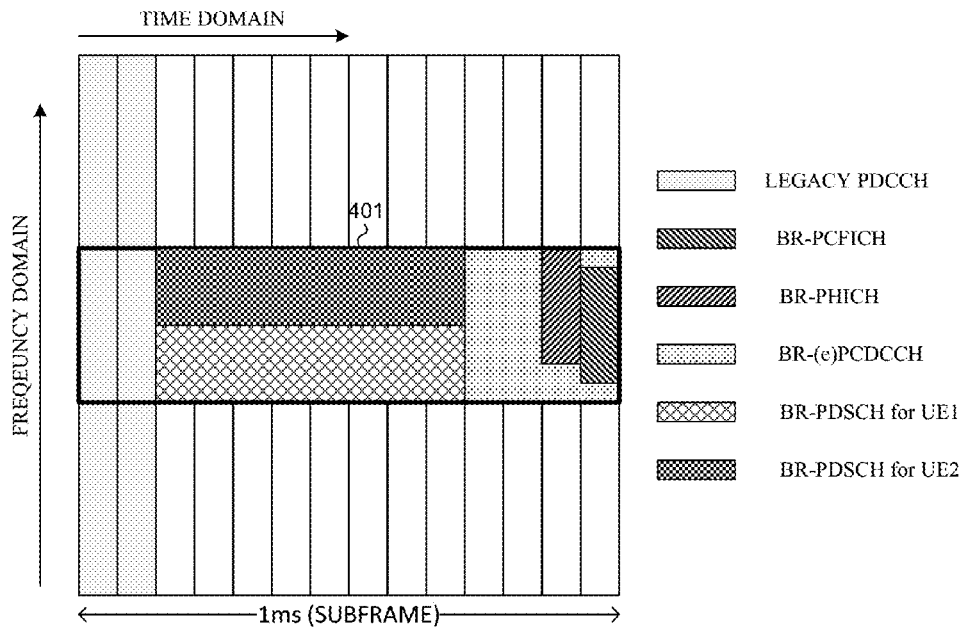
FIG. 4 illustrates one alternative embodiment of control channel and data channel designs for BR-UEs in accordance with one novel aspect.

FIG. 4 illustrates one alternative embodiment of control channel and data channel designs for BR-UEs in accordance with one novel aspect. The example of BR-control channel and BR-PDSCH provides a solution to legacy CFI issue.

Figure 5:
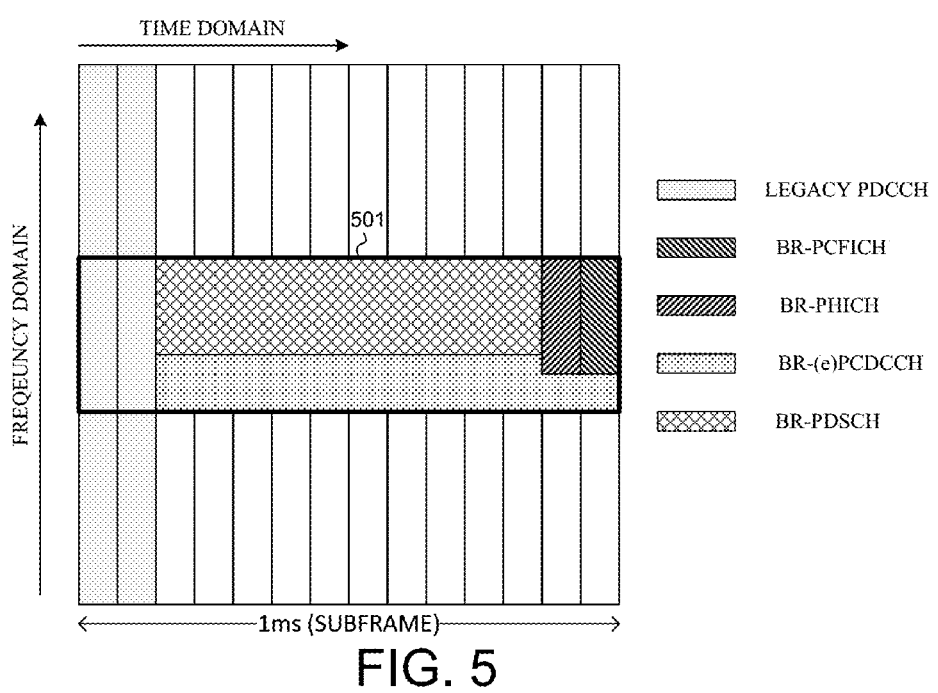
FIG. 5 illustrates another alternative embodiment of control channel and data channel designs for BR-UEs in accordance with one novel aspect.

FIG. 5 illustrates another alternative embodiment of control channel and data channel designs for BR-UEs in accordance with one novel aspect. The example of BR-control channel and BR-PDSCH provides a solution to legacy CFI issue.

Figure 6:
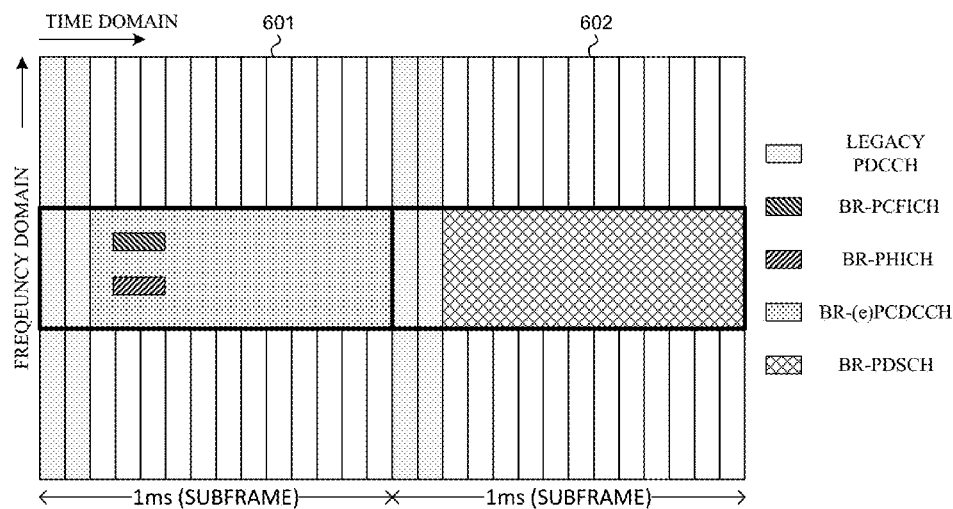
FIG. 6 illustrates a first embodiment of BR-control channel and PDCCH design for BR-UEs.

FIG. 6 illustrates a first embodiment of BR-control channel and ePDCCH design for BR-UEs. For reliable BR-control channel, in the first embodiment, the maximum aggregation level can be enlarged with cross subframe scheduling. To simplify blind decoding flow, the maximum aggregation level can be signaled by BR-PCFICH. As depicted by FIG. 6, one subframe 601 is consumed by BR-control in every HARQ retransmission. It requires longer active time, which results in higher power consumption for UE and lower spectrum efficiency. The UE can adopt lower code rate for BR-PDSCH by increasing repetition level and lowering transport block size (TBS) such as TDD/MCS-1 in data channel.

Figure 7:
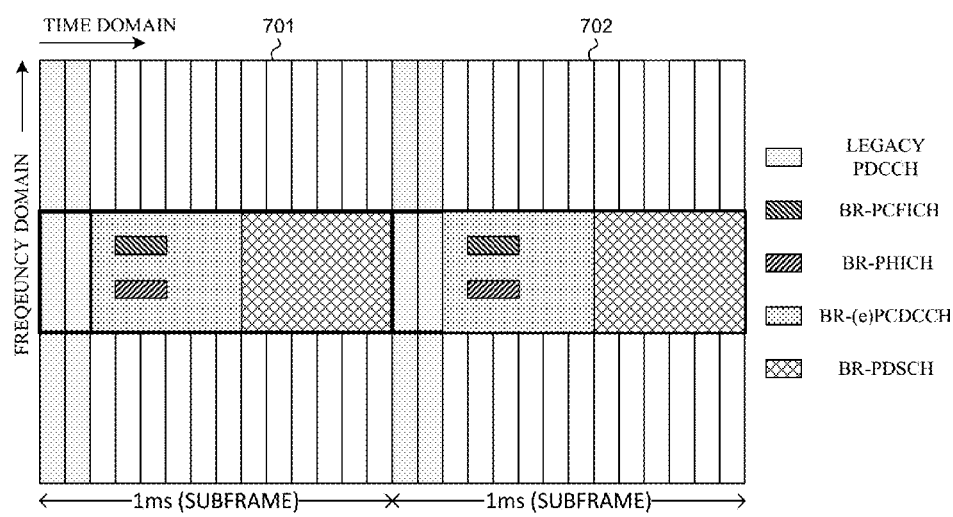
FIG. 7 illustrates a second embodiment of BR-control channel and PDCCH design for BR-UEs.

FIG. 7 illustrates a second embodiment of BR-control channel and ePDCCH design for BR-UEs. For reliable BR-control channel, in the second embodiment, eNB repeats the whole BR-control channels in several subframes. To simplify the complexity on decoding of BR-channels, the starting subframe index of repetition (e.g. subframe 701) is known by at least one of predefined rule(s), configured by RAR and higher layer signaling. With the knowledge of the starting subframe index of repetition, the needed memory to decoding all BR-control channels and BR-data channel will not increase. The main reason to enable repetition is that the channel quality for this BR-UE is quite poor. Repetition number can be decided in increasing or decreasing manner.

For example, in increasing manner, the repetition mechanism can be triggered by BR-UE reporting or by conditions. In one example, the repetition mechanism is triggered if the aggregation level of BR-(e)PDCCH is larger than a threshold and if eNB still cannot get any ACK/NACK from the target BR-UE for a predefined attempt number (N1). If the repetition mechanism is triggered and if eNB still cannot get any ACK/NACK from the target BR-UE for the predefined attempt number (N2), then the repetition level is doubled. If the repetition level is larger than the threshold (N3), then the BR-UE can be treated as out of service coverage. On the other hand, if the repetition mechanism is triggered and if eNB still can get every ACK/NACK from the target BR-UE for the predefined attempt number (N4), then the repetition level is halved. If repetition level is equal to one, then the repetition mechanism is disabled.

For reliable BR-control channel, the first embodiment and the second embodiment can be combined. Repetition level can be carried by new DCI or obtained blind detection. However, for the NACK/ACK reporting of BR-PDSCH, the resource of NACK/ACK allocation can be controlled by at least one of DCI carried by BR-control, higher layer signaling and predefined rules.

Furthermore, dynamic resource allocation for BR-control channel can be adopted for spectrum efficiency. For example, for the BR-UE close to cell center, the channel quality is quite well such and there is no need to allocate that many resources for BR-control channel. In a first option, Support dynamic resource allocation for BR-control channels via BR-PCFICH. It can also reduce the blind detection complexity by bundling BR-PCFICH and blind detection number for each aggregation level. In a second option, limited possible sizes of BR-control channel+blind detection the BR-control size by BR-UE. For example, there are four possible BR-(e)PDCCH channel sizes. In each possible BR-(e)PDCCH channel, the possible aggregation(s) and candidate number are limited for complexity reduction. In a third option, there is one BR-control channel size and pre-allocate resource for BR-control channels. If the resource is not used by BR-control channel, it can be released for BR-PDSCH transmission.

Figure 8:
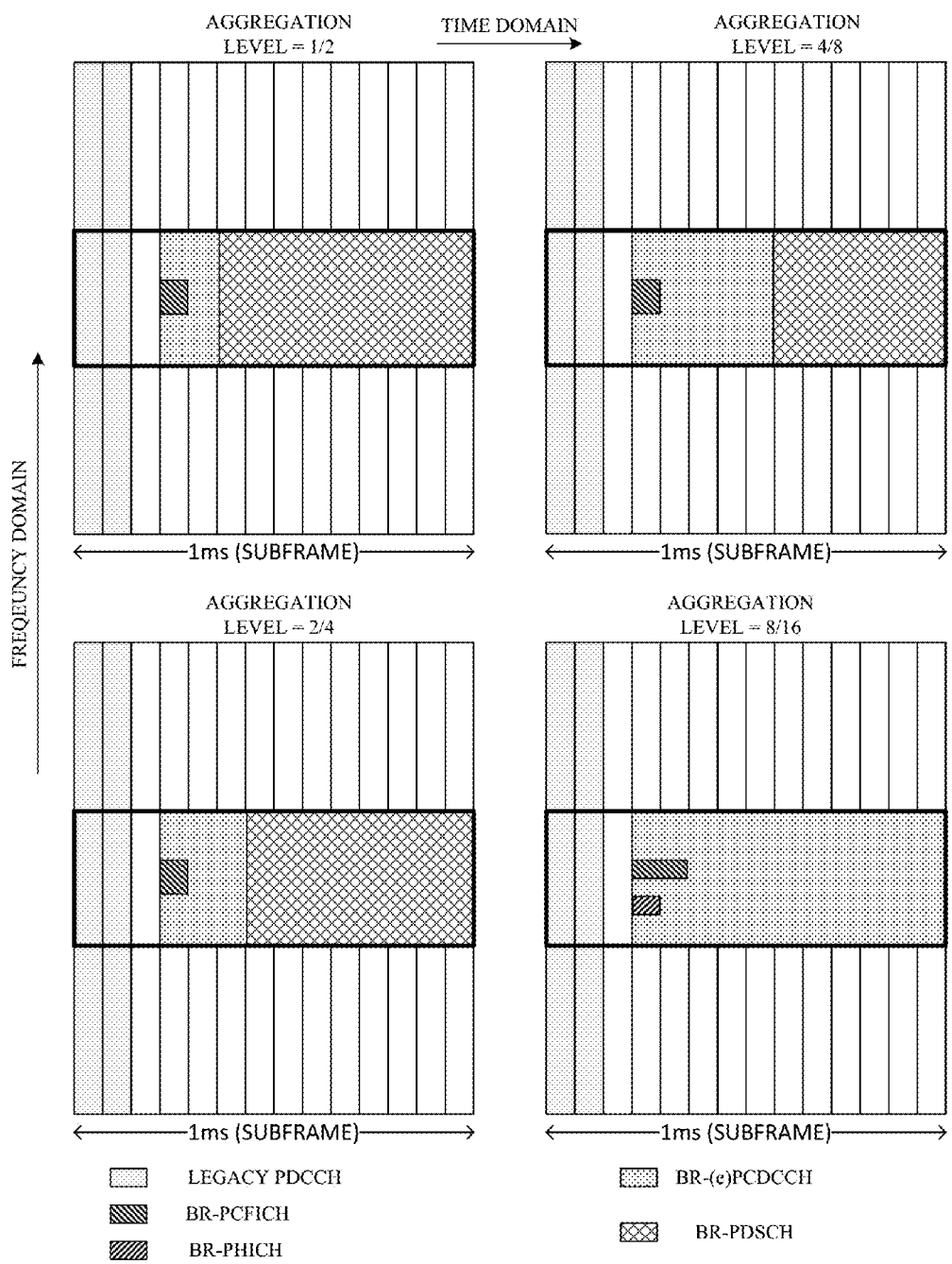
FIG. 8 illustrates different examples of PDCCH design with different aggregation levels for BR-UEs.

FIG. 8 illustrates different examples of PDCCH design with different aggregation levels for BR-UEs. The PDCCH candidates are defined based on the physical structure of resource element group (REG) and control channel element (CCE), and each candidate PDCCH has its own aggregation level utilizing CCE as the basic unit. Within the radio resources for PDCCH candidate definition, PRB pairs are first partitioned into REGs, and then each CCE is composed of several REGs. PDCCH aggregation level can be 1-16 CCEs depending on the PDCCH design. FIG. 8 illustrates five possible aggregation levels: 1/2/4/8/16. In one example aggregation level=16CCE, 19 CCE can be used for BR-control channels: 16 CCE for BR-PDCCH, 2 CCE for BR-PCFICH, 1 CCE for BR-PHICH.

There could be many BR-UEs within the coverage of an eNB. When there are too many BR-UEs, it is impossible to schedule all BR-UEs at center 6 PRB pairs, which carries PBCH and PSS/SSS for cell identification. Depending upon scheduling algorithm of the eNB, it is possible that the BR-UE is scheduled at the fixed PRB pairs that excludes center 6 PRB pairs for a while. In the worst case, there is no subframe for intra-frequency measurement, and for reference signal time different (RSTD) measurement. Therefore, it is proposed to make BR-UEs be able to perform intra-frequency/RSTD measurement.

Intra-frequency measurement includes RSRP/RSRQ measurements of the serving cell and neighboring cells. RSRP/RSRQ measurements are used to decide whether handover procedure shall be triggered. RSTD measurements is for positioning purpose. RSTD is a measure of time difference of arrival signals from different eNBs. The time differences from different base stations are then used to drive distance differences, which are further used to estimate UE position if having many RSTD measurements (e.g., with many different eNBs).

Figure 9:
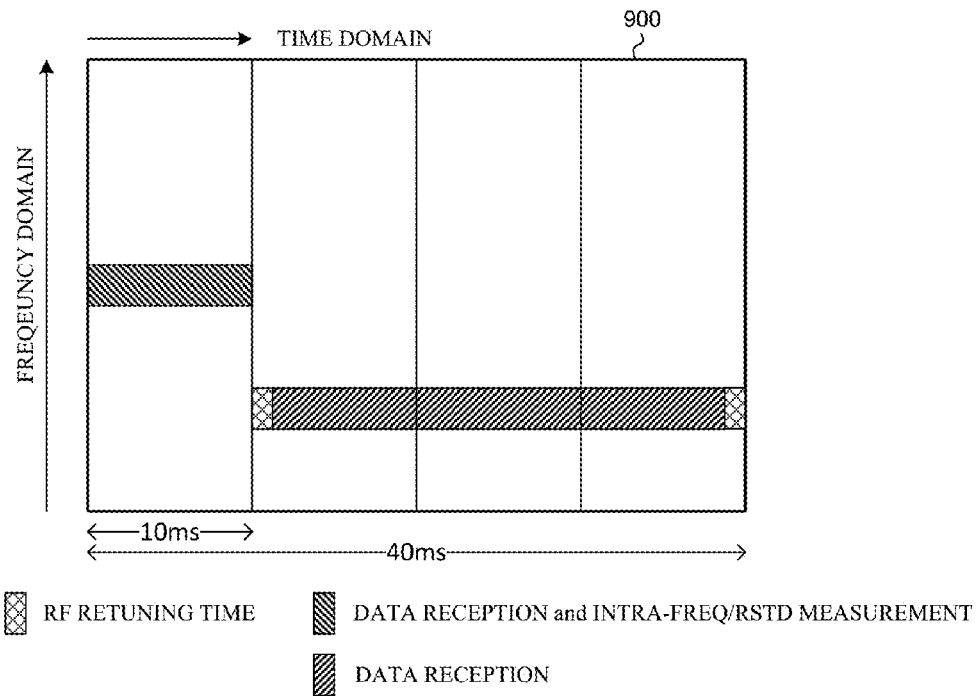
FIG. 9 illustrates one embodiment of assigning measurement gap for intra-frequency/RSTD measurements for BR-UEs.

FIG. 9 illustrates one embodiment of assigning measurement gap for intra-frequency/RSTD measurements for BR-UEs. For intra-frequency/RSTD measurement, the BR-UE shall have enough DL subframes that can be used for cell identification and measurement. In the embodiment of FIG. 9, the eNB assigns the frequency-hopping pattern that indicates PRB pair starting index per subframe for the BR-UE. Based on the frequency-hopping pattern, the BR-UE knows which DL subframes can be used for intra-frequency/RSTD measurement and the eNB guarantees that there are enough DL subframes can be used for intra-frequency/RSTD measurement. As depicted by box 900, the wideband DL BW is 50 PRBs. For BR-UEs, the periodicity of frequency hopping is 40 ms. During every 40 ms, 10 ms is available for DL data reception and intra-frequency and RSTD measurement (e.g., center PRBs allocated), and the remaining (30−2*RF retuning time) ms is available for DL data reception only.

In another embodiment, the eNB assigns a period of time for intra-frequency/RSTD measurement for the BR-UE. The BR-UE can skip some DL data receptions/monitoring and perform intra-frequency/RSTD measurement during the period of time (e.g., measurement gap) assigned by the eNB. The measurement gaps are used to enable the BR-UE to retune to central six PRBs to perform intra-frequency measurements. The measurement gap can be continuous or discontinuous. The configuration for measurement gap can be periodic or aperiodic. From BR-UE perspective, during the measurement gap assigned by the eNB, the BR-UE tunes the passband of DL filter for intra-frequency/RSTD measurement, and skips BR-PDCCH monitoring.

A BR-UE can only access of partial cell bandwidth at one subframe. Therefore, the BR-UE must have the information on which PRB pairs the serving eNB will schedule data. For the serving eNB without the information of UE channel quality of whole band, it is difficult to enable dynamic scheduling to allocate data on different PRB pairs. For low mobility BR-UE, if eNB has the whole band channel quality, eNB can assign a fixed/semi-static frequency-hopping pattern.

In accordance with one novel aspect, to collect of channel qualities of whole DL BW at the BR-UE side, channel scan procedure may be necessary to estimate channel quality in the whole DL BW. Before aperiodic/periodic (BR-subband) CQI reporting/frequency hopping pattern (re)assignment, the BR-UE can report DL channel quality by channel scan procedure to help eNB to make decision. BR-subband RSRP and BR-subband RSRQ is long-term averaged measures and BR-subband CQI is a short-term averaged measure. Based on the purpose of channel scan, eNB can configure the trigger or measure quantity as at least one of BR-subband RSRP, BR-subband RSRQ, and BR-subband CQI. Further, eNB can configure the reporting quantity as at least one of BR-subband RSRP, BR-subband RSRQ and BR-subband CQI. In one embodiment, eNB can assign the frequency-hopping pattern that indicates PRB pair starting index per subframe for the BR-UE. With the frequency-hopping pattern, the BR-UE exactly knows which PRB pairs shall be scanned and assessed in every subframe.

Figure 10:
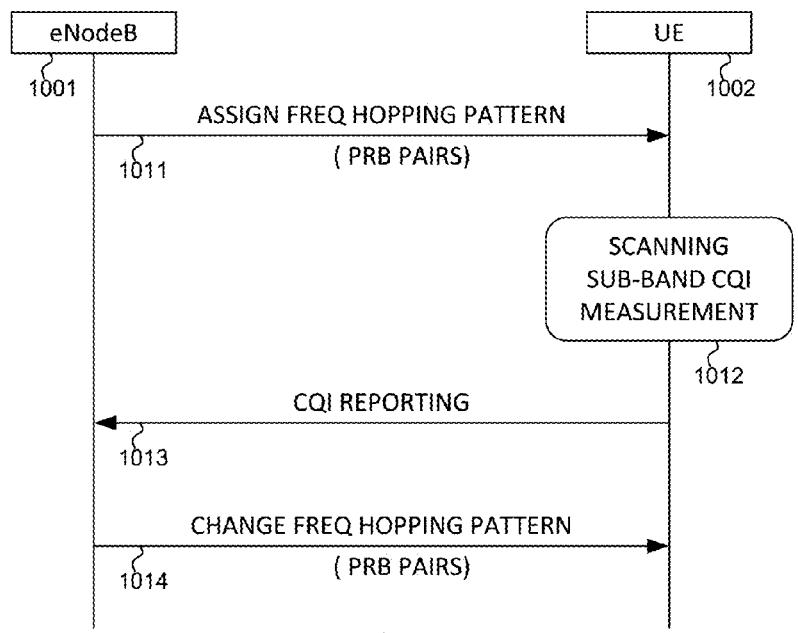
FIG. 10 illustrates one embodiment of assigning frequency-hopping pattern for performing scanning and narrowband CQI measurements and reporting.

FIG. 10 illustrates one embodiment of assigning frequency-hopping pattern for performing scanning and narrowband CQI measurements and reporting. In step 1011, eNB 1001 assigns the BR-UE specific/cell specific frequency hopping pattern, which indicates BR-PRB pairs per subframe for the BR-UE 1002. With this configured frequency hopping pattern, BR-UE 1002 can perform channel-scanning procedure in step 1012. Based on the frequency-hopping pattern, BR-UE 1002 knows which PRB pairs shall be estimated for channel quality and reported. The CSI measurement is performed for narrowband used for BR-PDCCH monitoring. During the channel scanning procedure, the eNB can still transmit DL data on the PRB pairs that the BR-UE is monitoring, or the eNB can buffer DL data for this BR-UE. During the channel scanning procedure, BR-UE 1002 can skip UL transmission. In step 1013, BR-UE 1002 reports the narrowband CQI based on the predefined rule or DCI order. In addition, eNB 1001 can configure the trigger, measure, or reporting quantity as at least one of BR-subband RSRP, BR-subband RSRQ, and BR-subband CQI. In step 1014, eNB 1001 changes an appropriate frequency-hopping pattern for BR-UE 1002 after receiving the CQI reporting. Note that wideband CQI is obtained using all the narrowband used for BR-PDCCH monitoring. Wideband CQI is the same as narrowband CQI when the BR-PDCCH is not configured with frequency hopping.

Figure 11:
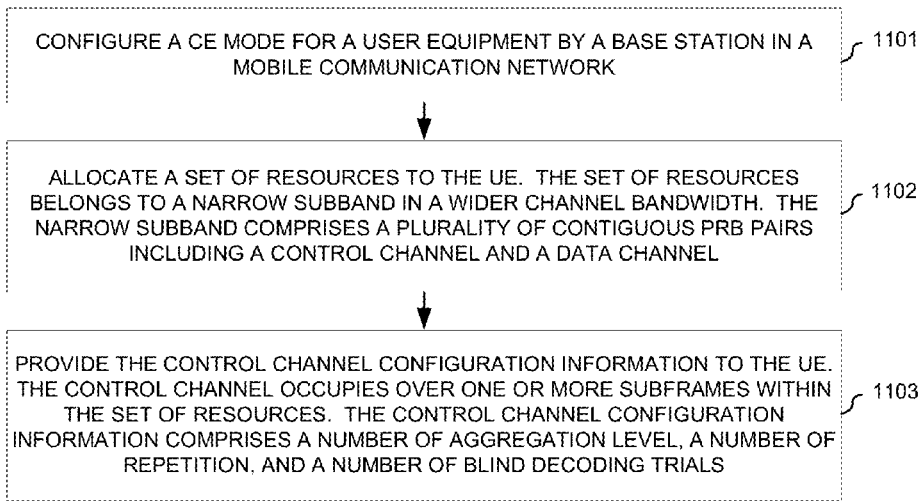
FIG. 11 is a flow chart of a method of control channel and data channel design from eNB perspective in accordance with one novel aspect.

FIG. 11 is a flow chart of a method of control channel and data channel design from eNB perspective in accordance with one novel aspect. In step 1101, a serving base station configures a CE mode for a user equipment (UE) in a mobile communication network. In step 1102, the base station allocates a set of resources to the UE. The set of resources belongs to a narrow subband in a wider channel bandwidth. The narrow subband comprises a plurality of contiguous PRB pairs including a control channel and a data channel. In step 1103, the base station provides the control channel configuration information to the UE. The control channel occupies over one or more subframes within the set of resources. The control channel configuration information comprises a number of aggregation level, a number of repetition, and a number of blind decoding trials. In one example, the base station assigns a measurement gap for intra-frequency and reference signal time difference (RSTD) measurements. In another example, the base station configures frequency hopping for the UE and indicates PRB pair starting index per subframe for channel state information (CSI) measurements.

Figure 12:
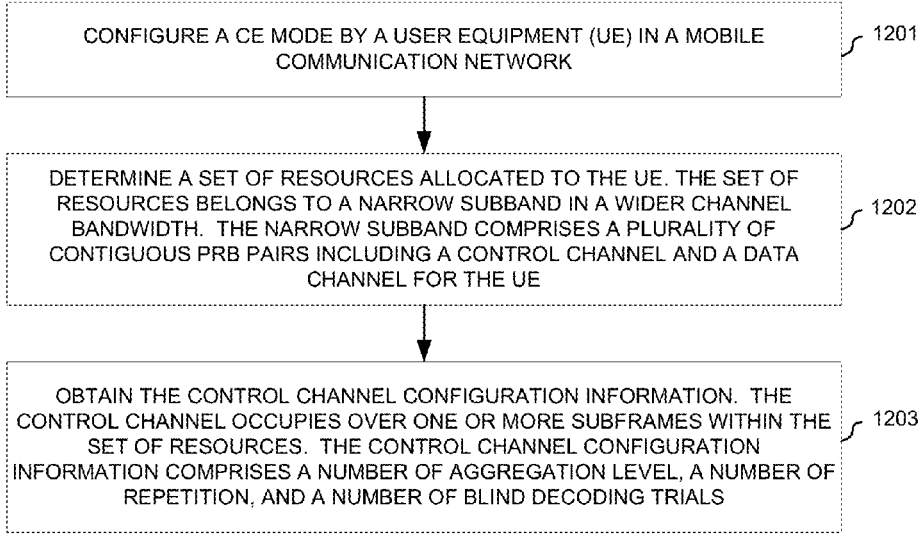
FIG. 12 is a flow chart of a method of control channel and data channel design from UE perspective in accordance with one novel aspect.

FIG. 12 is a flow chart of a method of control channel and data channel design for from UE perspective in accordance with one novel aspect. In step 1201, a user equipment (UE) configures a CE mode in a mobile communication network. In step 1202, the UE determines a set of resources allocated to the UE. The set of resources belongs to a narrow subband in a wider channel bandwidth. The narrow subband comprises a plurality of contiguous PRB pairs including a control channel and a data channel. In step 1203, the UE obtains the control channel configuration information. The control channel occupies over one or more subframes within the set of resources. The control channel configuration information comprises a number of aggregation level, a number of repetition, and a number of blind decoding trials. In one example, the UE is assigned a measurement gap for intra-frequency and reference signal time difference (RSTD) measurements. In another example, the BR-UE is configured with frequency hopping and receives PRB pair starting index per subframe for channel state information (CSI) measurements.

Figure 13:
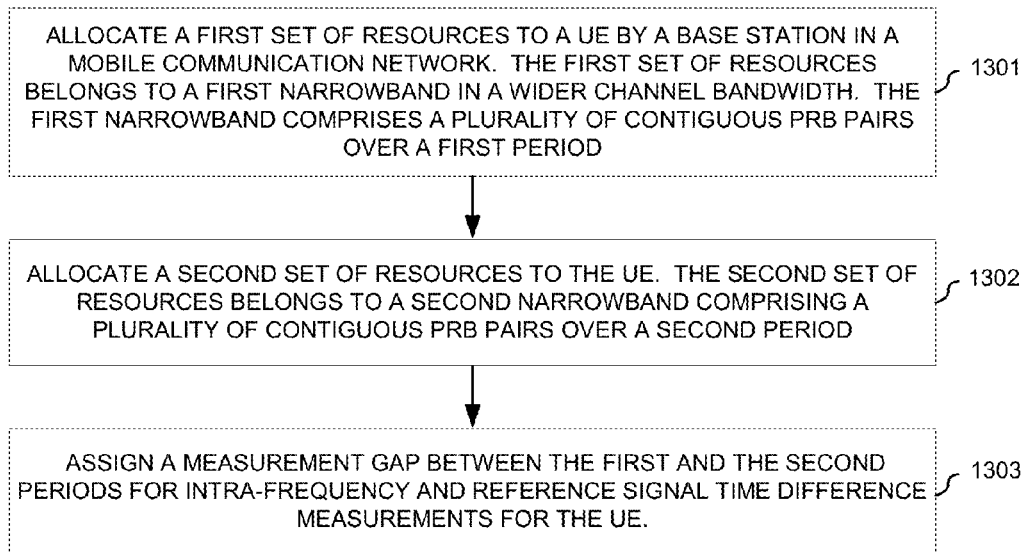
FIG. 13 is a flow chart of a method of intra-frequency and RSTD measurements from eNB perspective in accordance with one novel aspect.

FIG. 13 is a flow chart of a method of intra-frequency and RSTD measurements from eNB perspective in accordance with one novel aspect. In step 1301, a base station allocates a first set of resources to a UE in a mobile communication network. The first set of resources belongs to a first narrowband in a wider channel bandwidth. The first narrowband comprises a plurality of contiguous PRB pairs over a first period. In step 1302, the base station allocates a second set of resources to the UE. The second set of resources belongs to a second narrowband comprising a plurality of contiguous PRB pairs over a second period. In step 1303, the base station assigns a measurement gap between the first and the second periods for intra-frequency and RSTD measurements for the UE. In one example, the base station configures a frequency-hopping pattern for the UE and indicates PRB pair starting index per subframe for CSI measurements.

Figure 14:
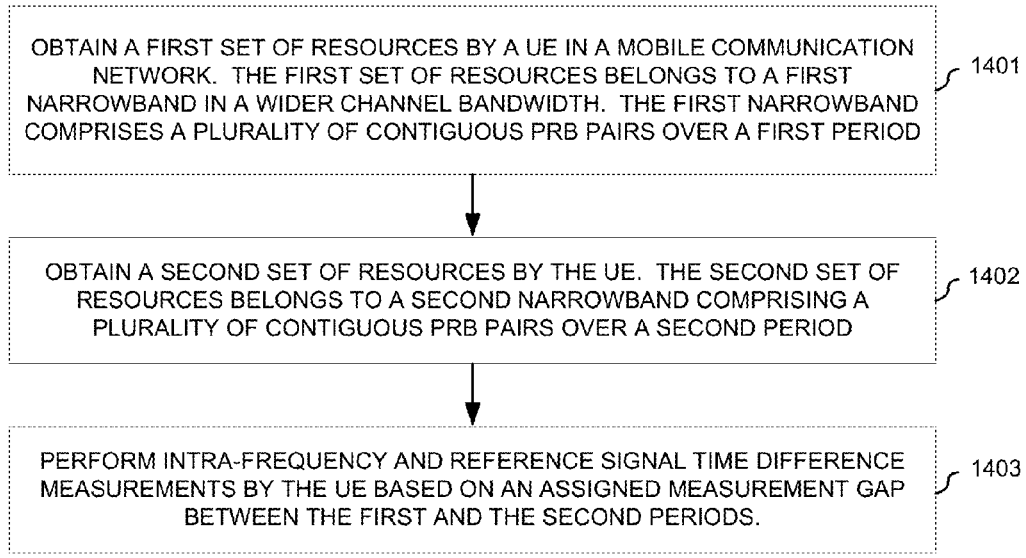
FIG. 14 is a flow chart of a method of intra-frequency and RSTD measurements from UE perspective in accordance with one novel aspect.

FIG. 14 is a flow chart of a method of intra-frequency and RSTD measurements from UE perspective in accordance with one novel aspect. In step 1401, a UE obtains a first set of resources in a mobile communication network. The first set of resources belongs to a first narrowband in a wider channel bandwidth. The first narrowband comprises a plurality of contiguous PRB pairs over a first period. In step 1402, the UE obtains a second set of resources belongs to a second narrowband comprising a plurality of contiguous PRB pairs over a second period. In step 1403, the UE performs intra-frequency and RSTD measurements based on an assigned measurement gap between the first and the second periods. In one example, the UE is configured with frequency hopping and receives PRB pair starting index per subframe for channel state information (CSI) measurements.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   allocating a first set of resources to a user equipment (UE) by a base station in a mobile communication network, wherein the first set of resource belongs to a first narrowband in a wider channel bandwidth, and wherein the first narrowband comprises a plurality of contiguous physical resource block ((PRE) pairs over a first period;
   allocating a second set of resources to the UE, wherein the second set of resources belongs to a second narrowband comprising a plurality of contiguous FRB pairs over a second period, wherein the first narrowband and/or the second narrowband excludes center FRB pairs carrying cell identification information; and
   assigning a measurement gap between the first and the second periods for intra-frequency measurement and for reference signal time difference (RSTD) measurement over the center PRB pairs for the UE.

2. The method of claim 1, wherein each of the first set and the second set of resources is identified by a starting PRB index and a number of consecutive PRB pairs.

3. The method of claim 1, wherein each of the first set and the second set of resources is determined based on at least one of a predefined rule, a random access response, a downlink control channel information (DCI) order, and higher layer signaling.

4. The method of claim 1, wherein the measurement gap is continuous or discontinuous, and wherein occurrence of the measurement gap is periodic or aperiodic.

5. The method of claim 1, wherein the base station configures a frequency-hopping pattern for the UE and indicates PRB pair starting index per subframe.

6. The method of claim 5, wherein the indicated PRB pair starting index is used for channel state information (CSI) measurements.

7. The method of claim 5, wherein the base station receives a channel quality report from the UE and in response changes the frequency-hopping pattern.

8. A method comprising:
obtaining a first set of resources by a user equipment (UE) in a mobile communication network, wherein the first set of resource belongs to a first narrowband in a wider channel bandwidth, and wherein the first narrowband comprises a plurality of contiguous physical resource block (PRB) pairs over a first period;
obtaining a second set of resources by the UE, wherein the second set of resources belongs to a second narrowband comprising a plurality of contiguous PRB pairs over a second period; and
performing intra-frequency measurement and/or reference signal time difference (RSTD) measurement by the UE based on an assigned measurement gap between the first and the second periods, wherein the UE skips physical downlink control channel (PDCCH) monitoring and tunes a passband of downlink filter for intra-frequency and/or RSTD measurements during the measurement gap.

9. The method of claim 8, wherein each of the first set and the second set of resources is determined based on at least one of a predefined rule, a random access response, a downlink control channel information (DCI) order, and higher layer signaling.

10. The method of claim 8, wherein the measurement gap is continuous or discontinuous, and wherein occurrence of the measurement gap is periodic or aperiodic.

11. The method of claim 8, wherein the UE is configured with a frequency-hopping pattern and receives a PRB pair starting index per subframe.

12. The method of claim 11, wherein the UE performs channel state information (CSI) measurements using the indicated PRB pair starting index.

13. The method of claim 11, wherein the UE sends a channel quality report and in response receives an updated frequency-hopping pattern.

14. A user equipment (UE) comprising:
a resource configuration circuit that obtains a first set of resources in a mobile communication network, wherein the first set of resource belongs to a first narrowband in a wider channel bandwidth, and wherein the first narrowband comprises a plurality of contiguous physical resource block (PRB) pairs over a first period;
the resource configuration circuit that obtains a second set of resources by the UE, wherein the second set of resources belongs to a second narrowband comprising a plurality of contiguous PRB pairs over a second period; and
a measurement circuit that performs intra-frequency measurement and/or reference signal time difference (RSTD) measurement by the UE based on an assigned measurement gap between the first and the second periods, wherein the UE skips physical downlink control channel (PDCCH) monitoring and tunes a passband of downlink filter for intra-frequency and/or RSTD measurements during the measurement gap.

15. The UE of claim 14, wherein each of the first set and the second set of resources is determined based on at least one of a predefined rule, a random access response, a downlink control channel information (DCI) order, and higher layer signaling.

16. The UE of claim 14, wherein the measurement gap is continuous or discontinuous, and wherein occurrence of the measurement gap is periodic or aperiodic.

17. The UE of claim 14, wherein the UE is configured with a frequency-hopping pattern and receives a PRB pair starting index per subframe for channel state information (CSI) measurements.

18. The UE of claim 14, wherein the UE is a low cost machine type communication (MTC) device with bandwidth reduction.

* * * * *

UNITED STATES PATENT AND TRADEMARK OFFICE
CERTIFICATE OF CORRECTION

PATENT NO. : 10,111,066 B2  
APPLICATION NO. : 15/008281  
DATED : October 23, 2018  
INVENTOR(S) : Kuhn-Chang Lin et al.

Page 1 of 1

It is certified that error appears in the above-identified patent and that said Letters Patent is hereby corrected as shown below:

In the Claims

Column 12, Line 51, the word "((PRE)" should be "(PRB)"

Column 12, Line 55, the word "FRB" should be "PRB"

Column 12, Line 57, the word "FRB" should be "PRB"

Signed and Sealed this  
Fifth Day of March, 2019

Andrei Iancu  
*Director of the United States Patent and Trademark Office*